(12) United States Patent
Muraishi

(10) Patent No.: US 12,047,537 B2
(45) Date of Patent: Jul. 23, 2024

(54) PRINTING SYSTEM, METHOD FOR CONTROLLING THE SAME, AND STORAGE MEDIUM FOR INSPECTING A PRINT PRODUCT

(71) Applicant: CANON KABUSHIKI KAISHA, Tokyo (JP)

(72) Inventor: Masaaki Muraishi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/062,952

(22) Filed: Dec. 7, 2022

(65) Prior Publication Data

US 2023/0188651 A1    Jun. 15, 2023

(30) Foreign Application Priority Data

Dec. 10, 2021   (JP) .................................. 2021-200580

(51) Int. Cl.
 *H04N 1/00*    (2006.01)

(52) U.S. Cl.
CPC ..... *H04N 1/00045* (2013.01); *H04N 1/00015* (2013.01); *H04N 1/00037* (2013.01); *H04N 1/0044* (2013.01); *H04N 1/00477* (2013.01); *H04N 1/00482* (2013.01)

(58) Field of Classification Search
CPC ........... H04N 1/00045; H04N 1/00015; H04N 1/00037; H04N 1/0044; H04N 1/00477; H04N 1/00482

USPC ....................................................... 358/1.15
See application file for complete search history.

(56) References Cited

U.S. PATENT DOCUMENTS

| 11,755,260 | B2 * | 9/2023 | Kashiwagi | ............ G06F 3/1285 |
| | | | | 358/1.13 |
| 2020/0228673 | A1 * | 7/2020 | Wakana | ............. H04N 1/00623 |
| 2020/0314274 | A1 * | 10/2020 | Hasegawa | .......... H04N 1/00082 |
| 2020/0314279 | A1 * | 10/2020 | Wakai | ................ H04N 1/00806 |
| 2023/0269333 | A1 * | 8/2023 | Kikumoto | .......... H04N 1/00461 |
| | | | | 358/1.13 |

FOREIGN PATENT DOCUMENTS

JP    2020163804 A    10/2020

* cited by examiner

*Primary Examiner* — Kent Yip
(74) *Attorney, Agent, or Firm* — Canon U.S.A., Inc. IP Division

(57) ABSTRACT

A printing system includes a printer unit configured to print an image on a recording sheet, an inserter configured to insert a sheet into a print product obtained by printing the image on the recording sheet, and one or more controllers having one or more processors and one or more memories. The one or more controllers are configured to generate scanned images by causing the printing system to read the print product and the inserted sheet, register a reference image, inspect the print product based on a scanned image generated by reading the print product and the reference image, set an insertion position of the sheet to be inserted, and perform control so that a scanned image corresponding to the set insertion position of the sheet is not to be inspected.

16 Claims, 15 Drawing Sheets

PRINTING SYSTEM, METHOD FOR CONTROLLING THE SAME, AND STORAGE MEDIUM FOR INSPECTING A PRINT PRODUCT

BACKGROUND

Field of the Disclosure

The present disclosure relates to a printing system, a method for controlling the printing system, and a storage medium.

Description of the Related Art

Conventionally, inspection (product inspection) for checking whether a print product is properly printed is manually performed. In recent years, however, an inspection apparatus that automatically performs the inspection as post-processing for a printing machine has been used. Such an inspection apparatus (a product inspection apparatus) registers correct answer image data (reference image data) first. Then, an image forming apparatus prints out input image data on a sheet, and an inspection sensor inside the inspection apparatus reads a print product obtained by printing out the image data on the sheet. The inspection apparatus compares the image data read by the inspection sensor and the registered correct answer image data, thereby detecting a defect in the print product. Inspection for detecting a defect in a print image portion of the print product is referred to as "print image inspection".

In the print image inspection, a reference image registered in advance and image data read during the inspection are compared with each other, thereby detecting a defect. At this time, if a partition sheet (an insertion sheet) for which a reference image is not registered is conveyed to the inspection apparatus based on a print job to be inspected, product inspection processing is performed on the insertion sheet, and this causes the insertion sheet to be processed as a print defect.

Japanese Patent Application Laid-Open No. 2020-163804 discusses a method of printing a code on an insertion sheet in advance and reading the code, thereby determining the insertion sheet as a non-inspection target sheet and performing control not to perform product inspection processing on the insertion sheet.

SUMMARY

According to embodiments of the present disclosure, a printing system includes a printer unit configured to print an image on a recording sheet, an inserter configured to insert a sheet into a print product obtained by printing the image on the recording sheet, and one or more controllers having one or more processors and one or more memories, the one or more controllers being configured to generate scanned images by causing the printing system to read the print product and the inserted sheet, register a reference image, inspect the print product based on a scanned image generated by reading the print product and the reference image, set an insertion position of the sheet to be inserted, and perform control so that a scanned image corresponding to the set insertion position of the sheet is not to be inspected.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the attached drawings. The following exemplary embodiments do not limit the present disclosure, and not all combinations of the features described in the exemplary embodiments are essential to the solving means of the present disclosure.

Figure 1:
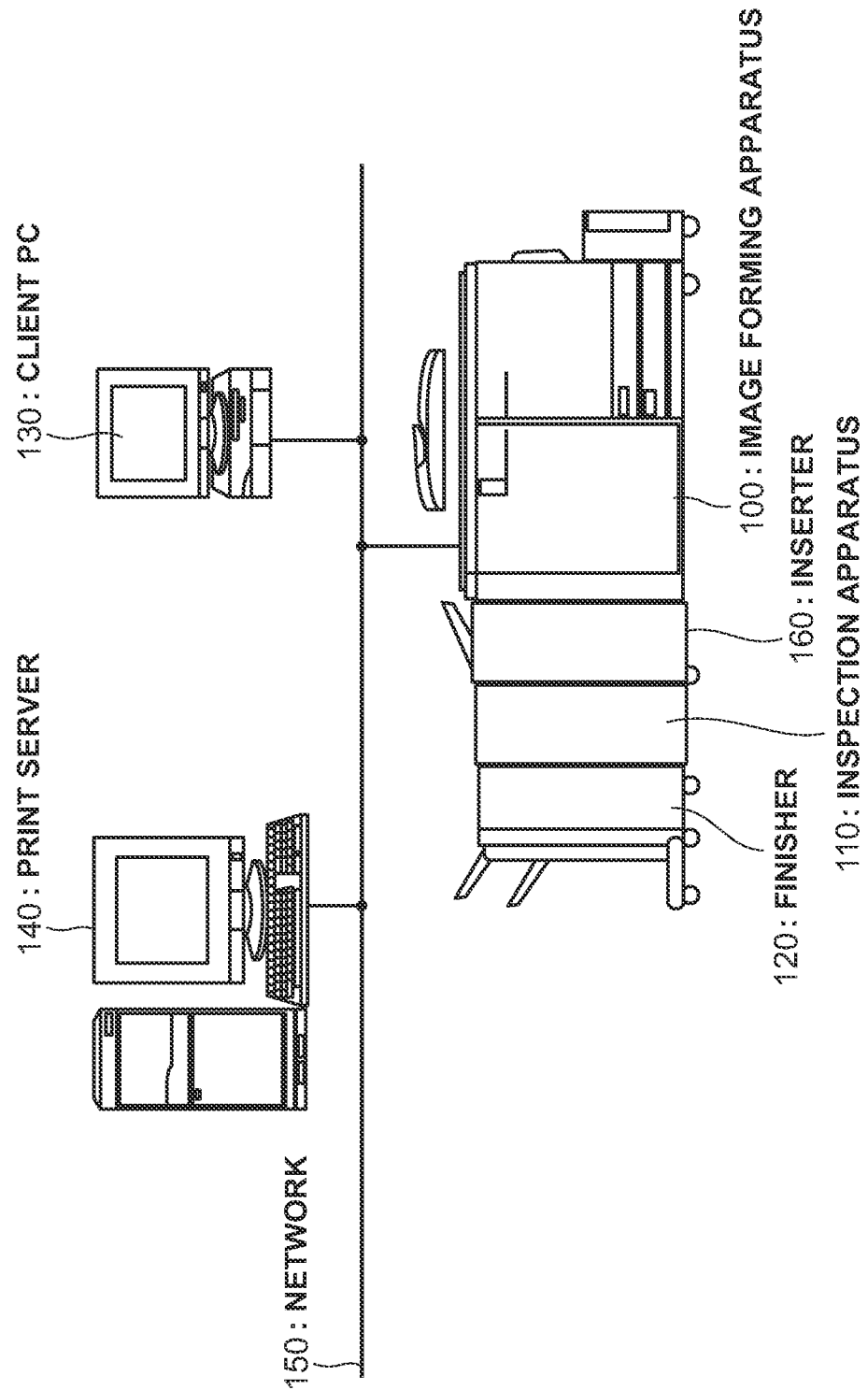
FIG. 1 is a diagram illustrating an example of a configuration of a system including an inspection apparatus according to a first exemplary embodiment.

FIG. 1 illustrates an example of a configuration of a system including an inspection apparatus 110 according to a first exemplary embodiment of the present disclosure. The system includes an image forming apparatus 100, the inspection apparatus 110, a finisher 120, a client personal computer (PC) 130, a print server 140, a network 150 (e.g., a local area network), and an inserter 160. The image forming apparatus 100 may also be referred to as a multifunction peripheral (MFP).

The image forming apparatus 100 performs print output based on various pieces of input data, for example, based on print data transmitted from the client PC 130 or the print server 140.

The inserter 160 inserts an insertion sheet (a sheet) into a print product output from the image forming apparatus 100, based on a setting for the print data. The print product and the insertion sheet are conveyed to the inspection apparatus 110 along a conveying path.

The inspection apparatus 110 receives the print product output from the image forming apparatus 100 and the insertion sheet inserted by the inserter 160, and inspects the received print product for defects. The defects refer to those that decrease the quality of the print product, for example, dirt that occurs due to attachment of a color material to an unintended portion during printing, and color loss that occurs due to insufficient attachment of a color material to an intended portion during printing.

The inspection apparatus 110 performs print image inspection as described above.

The finisher 120 receives an output sheet inspected by the inspection apparatus 110, switches the sheet discharge destination based on a result of the inspection by the inspection apparatus 110, optionally performs post-processing (bookbinding), and discharges the sheet.

The image forming apparatus 100 is connected to the client PC 130 and the print server 140 via the network 150 and also connected to the inspection apparatus 110, the finisher 120, and the inserter 160 via communication cables. The inspection apparatus 110 is connected to the finisher 120 via a communication cable in addition to the image forming apparatus 100. In the present exemplary embodiment, an in-line inspection machine that consistently performs image formation, inspection, post-processing, and sheet discharge is illustrated. In the present exemplary embodiment, at least the image forming apparatus 100 and the inspection apparatus 110 are collectively referred to as a printing system.

[Internal Configuration of Image Forming Apparatus]

Figure 2:
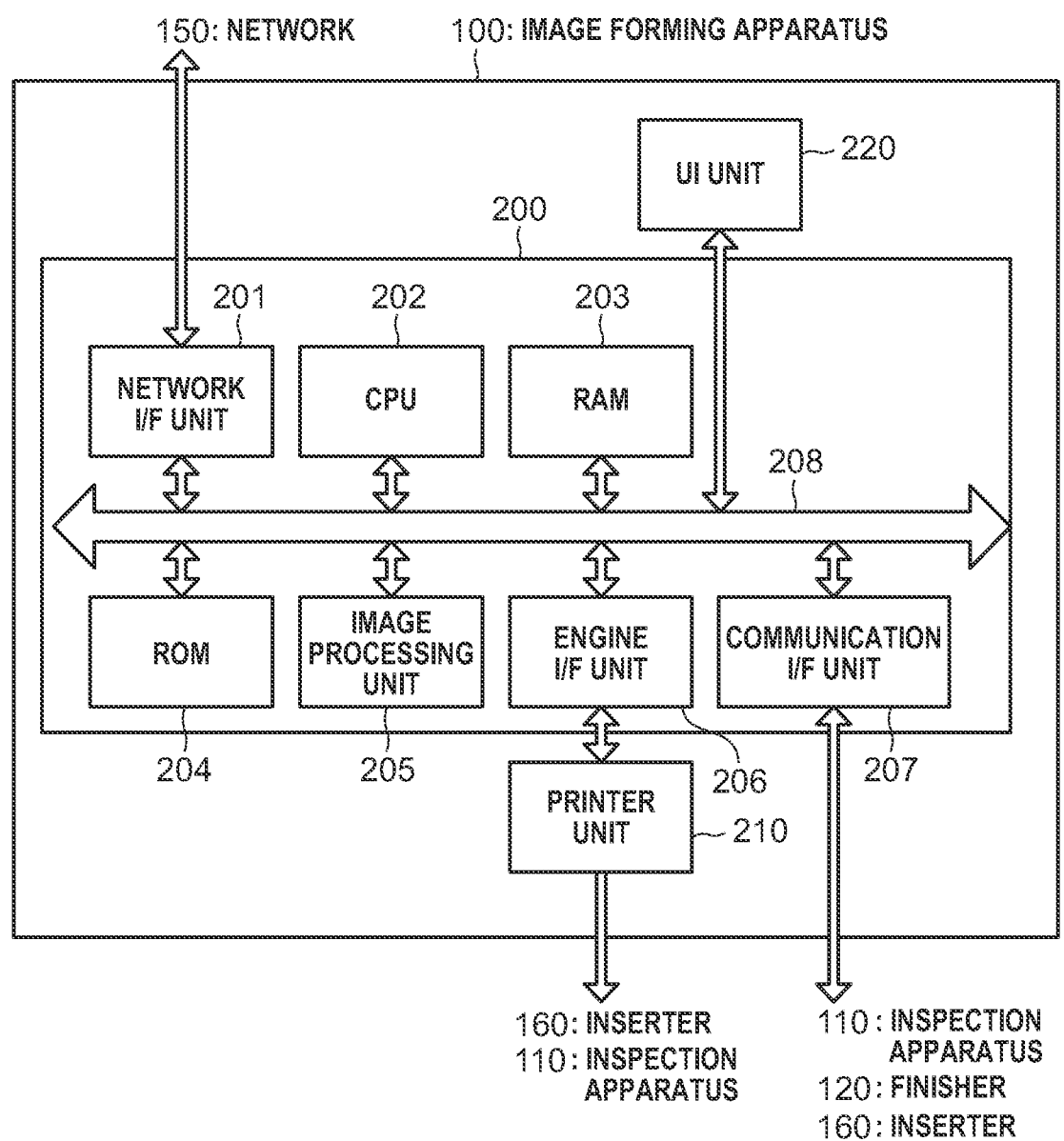
FIG. 2 is a diagram illustrating an example of an internal configuration of an image forming apparatus according to the first exemplary embodiment.

FIG. 2 illustrates an example of an internal configuration of the image forming apparatus 100 according to the present exemplary embodiment.

A controller 200 receives an image or a document via the network 150 and converts the received image or document into print data. A printer unit 210 prints the print data on a recording sheet (a piece of paper or a sheet). A user interface (UI) unit 220 displays a screen and receives an instruction about, for example, selection of a sheet type given by a user to the image forming apparatus 100. The image forming apparatus 100 includes the controller 200, the printer unit 210, and the UI unit 220. The controller 200 includes the following components 201 to 208.

A network interface (I/F) unit 201 transmits and receives data to and from the client PC 130 and the print server 140 via the network 150. A central processing unit (CPU) 202 controls the entire image forming apparatus 100.

A random-access memory (RAM) 203 is a work area used by the CPU 202 to execute various commands. A read-only memory (ROM) 204 stores program data to be executed by the CPU 202 at startup, and setting data on the controller 200.

An image processing unit 205 performs raster image processer (RIP) processing for converting the image data or document data received via the network 150 into print data.

An engine I/F unit 206 transmits the print data to the printer unit 210.

A communication I/F unit 207 communicates with the inspection apparatus 110, the finisher 120, and the inserter 160. The controller 200 also includes an internal bus (a system bus) 208.

An image or a document generated by the client PC 130 or the print server 140 on the network 150 is transmitted as page description language (PDL) data to the image forming apparatus 100 via the network 150. The transmitted PDL data is saved in the RAM 203 via the network I/F unit 201. A print instruction given by the user on the UI unit 220 is also saved in the RAM 203 via the internal bus 208. The print instruction given by the user refers to, for example, the selection of the sheet type.

The image processing unit 205 acquires the PDL data saved in the RAM 203 and performs image processing for converting the PDL data into print data. The image processing for converting the PDL data into print data refers to converting the PDL data into binary bitmap data, for example, by rasterizing the PDL data, converting the PDL data into multivalued bitmap data, and performing screen processing on the multivalued bitmap data. The binary bitmap data obtained by the image processing unit 205 is transmitted to the printer unit 210 via the engine I/F unit 206.

The printer unit 210 prints the received binary bitmap data on a recording sheet using a color material. The CPU 202 gives an instruction to the printer unit 210 based on the print instruction given by the user and saved in the RAM 203. For example, if the user gives an instruction to perform printing on coated paper, the CPU 202 instructs the printer unit 210 to output a sheet from a sheet cassette (not illustrated) that stores coated paper inside the image forming apparatus 100. The various types of processing from the reception of the PDL data to the printing of the binary bitmap data on the sheet are controlled by the CPU 202, thereby forming a full-color toner image on the sheet.

[Internal Configuration of Inspection Apparatus]

Figure 3:
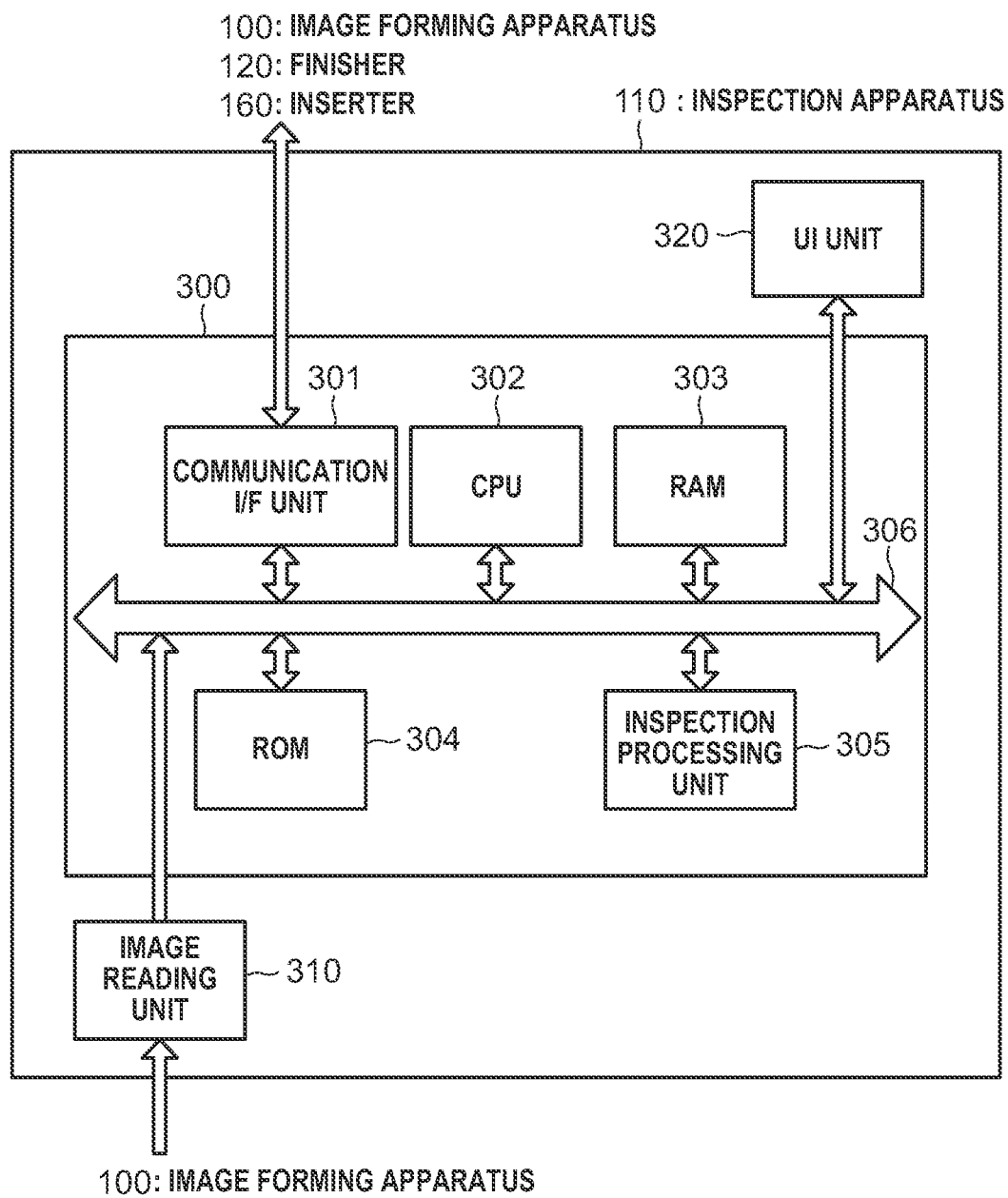
FIG. 3 is a diagram illustrating an example of an internal configuration of the inspection apparatus according to the first exemplary embodiment.

FIG. 3 illustrates an example of an internal configuration of the inspection apparatus 110.

An inspection control unit 300 controls the entire inspection apparatus 110 and inspects print products for defects.

An image reading unit 310 reads a print product conveyed from the image forming apparatus 100.

The image reading unit 310 reads the print product, thereby generating a scanned image (corresponding to a read sheet).

A UI unit 320 is used by the user to set the inspection apparatus 110 and displays an inspection result to the user. The setting of the inspection apparatus 110 by the user refers to setting an inspection item indicating the type of defect to be detected when a print product is inspected. The inspection item is, for example, a circular defect (a dot) or a linear defect (a streak). The inspection apparatus 110 includes the inspection control unit 300, the image reading unit 310, and the UI unit 320. In the present exemplary embodiment, the UI unit 320 includes a display unit that displays a screen, and a display control unit that controls the screen displayed on the display unit.

The inspection control unit 300 includes the following components 301 to 306. A communication I/F unit 301 transmits and receives data to and from the image forming apparatus 100, the finisher 120, and the inserter 160. A CPU 302 controls the entire inspection apparatus 110. A RAM 303 is a work area used by the CPU 302 to execute various commands. A ROM 304 stores program data to be executed by the CPU 302 at startup, and setting data on the inspection control unit 300. An inspection processing unit 305 inspects print products for defects. An internal bus 306 is a system bus.

Next, an overview of the print image inspection performed by the inspection apparatus 110 will be described.

The inspection apparatus 110 causes the image reading unit 310 to read the print product conveyed from the image forming apparatus 100 and acquires scanned images as inspection targets. The acquired scanned images as the inspection targets are saved in the RAM 303.

Next, the inspection apparatus 110 causes the inspection processing unit 305 to perform inspection by comparing one of the scanned images as the inspection targets and a corresponding one of reference images saved as correct answer images in advance in the RAM 303. More specifically, the inspection processing unit 305 extracts feature points from each of the reference image and the scanned image, and aligns the scanned image with the reference image based on the extracted feature points. If a difference between the pixel value (the luminance value) of an inspection target pixel in the aligned scanned image and the pixel value (the luminance value) of a comparison target pixel in the reference image is less than or equal to a threshold, the inspection processing unit 305 determines the inspection target pixel as "pass". The threshold depends on an inspection level (described below). The above inspection is performed for each of the reference images corresponding to the scanned images.

If the inspection of all the pixels is completed, the inspection processing unit 305 determines whether the total number of pixels determined as "fail" is less than or equal to an acceptance threshold, thereby determining whether the scanned image is normal. If the total number of pixels determined as "fail" is less than or equal to the acceptance threshold, the inspection processing unit 305 determines that the scanned image is normal. If the total number of pixels determined as "fail" exceeds the acceptance threshold, the inspection processing unit 305 determines that the scanned image is not normal.

The results of the inspection are saved in the RAM 303, and for example, include information about whether a defect is detected from the print product, the type (dot or streak) of the detected defect, and defect position information to be used for display on the UI unit 320.

Next, the inspection apparatus 110 causes the CPU 302 to instruct the UI unit 320 to display the inspection results saved in the RAM 303. The UI unit 320 displays the inspection results, whereby the user can recognize the inspection results.

If a certain number of successive print products are defective, the inspection apparatus 110 causes the CPU 302 to transmit this information to the image forming apparatus 100 via the communication I/F unit 301.

The information indicating that defective print products successively occur is received by the controller 200 via the communication I/F unit 207. When the controller 200 receives the information, the CPU 202 instructs the printer unit 210 to stop printing. The printer unit 210 is instructed to stop printing, whereby the image forming apparatus 100 stops the printing operation.

Further, based on the inspection results saved in the RAM 303, the inspection apparatus 110 causes the CPU 302 to transmit information to the finisher 120 via the communication I/F unit 301. The information transmitted to the finisher 120 is information about whether each print product has a defect. Based on the received information, the finisher 120 discharges a print product without a defect to a normal sheet discharge tray and discharges a print product with a defect to a tray different from the normal sheet discharge tray.

<UI Screens>

FIGS. 5 to 10B are examples of screens displayed on the UI unit 320 of the inspection apparatus 110. Each of the screens is displayed based on an instruction from the CPU 302 of the inspection apparatus 110.

Product inspection performed by the printing system according to the present exemplary embodiment is divided into three main processes. The first process is a reference image registration process, which is the process of registering a reference image to be compared with an inspection image. The second process is an inspection setting process, which is the process of setting an inspection area where the inspection is to be performed, the inspection level, and the like. The third process is an inspection process, which is the process of inspecting an inspection job based on the image registered as the reference image and the inspection settings.

The product inspection according to the present exemplary embodiment is performed in the order of the reference image registration process, the inspection setting process, and the inspection process.

The reference image registration process will be described with reference to FIGS. 6, 7A, and 7B. The inspection setting process will be described with reference to FIG. 8. The inspection process will be described with reference to FIGS. 9, 10A, and 10B.

Figure 5:
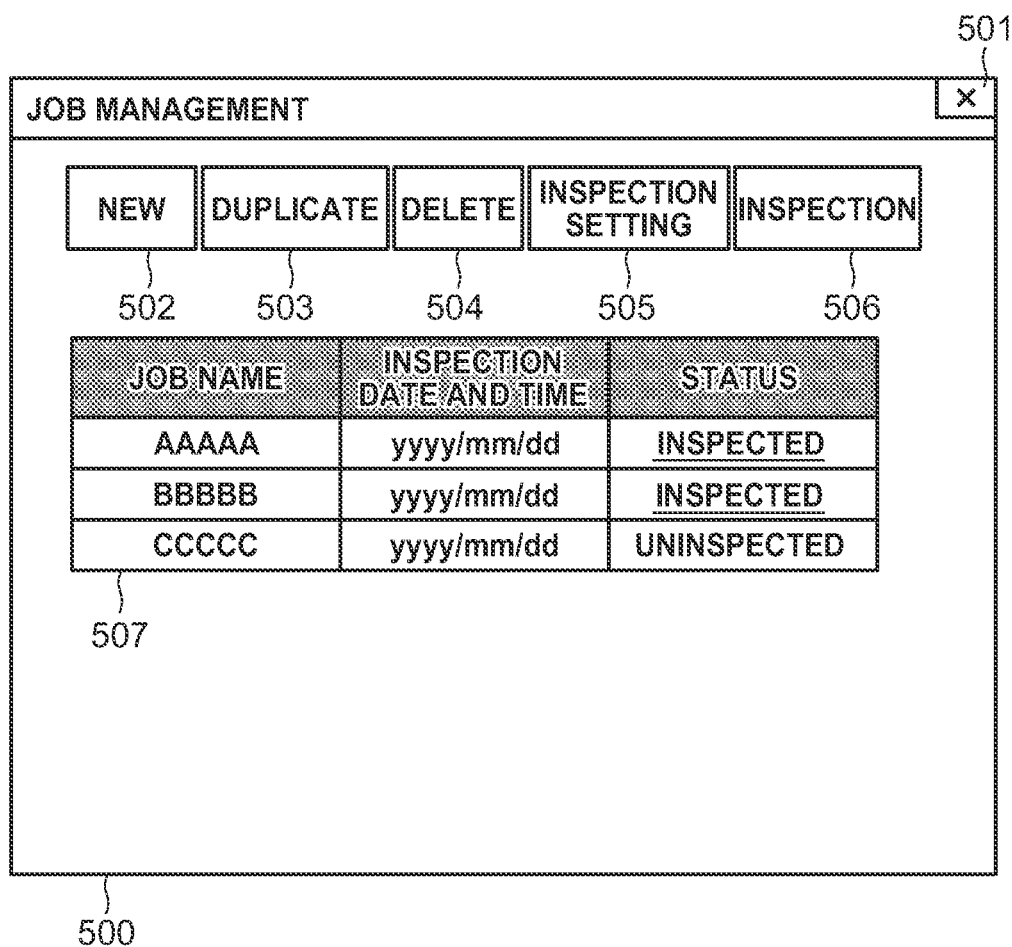
FIG. 5 is a diagram illustrating an example of a user interface (UI) screen for job management according to the first exemplary embodiment.

FIG. 5 illustrates an example of a job management screen 500 displayed on the UI unit 320.

The job management screen 500 is displayed when the inspection apparatus 110 is started or when an application is started by a user's operation on the UI unit 320.

The job management screen 500 enables a transition to each of the reference image registration process, the inspection setting process, and the inspection process.

A button 501 is used to turn off the display of the job management screen 500.

Figure 6:
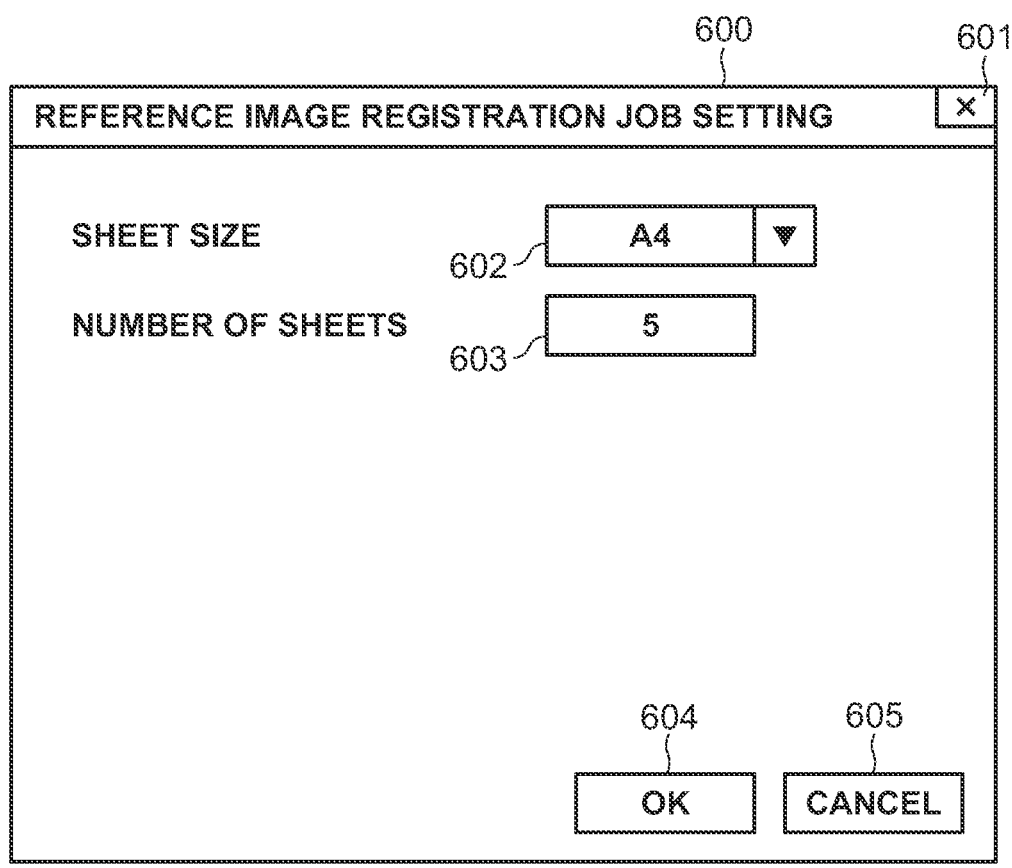
FIG. 6 is a diagram illustrating an example of a UI screen for reference image registration job setting according to the first exemplary embodiment.

A button 502 is used to newly generate an inspection job and enables a transition to a reference image registration job setting screen 600 illustrated in FIG. 6.

A button 503 is used to duplicate an already generated inspection job. The button 503 is used to duplicate an inspection job selected in an inspection job list 507. This duplication enables the user to duplicate a reference image and inspection settings and newly perform inspection.

A button 504 is a "delete" button used to delete an inspection job selected in the inspection job list 507. By selecting a plurality of inspection jobs from the inspection job list 507 and pressing the button 504, the user can delete the plurality of inspection jobs at a time.

A button 505 is an "inspection setting" button used to make inspection settings for an inspection job for which the reference image registration process is completed. When the button 505 is pressed, the job management screen 500 transitions to an inspection setting screen 800 illustrated in FIG. 8.

A button 506 is an "inspection" button used to inspect an inspection job for which the reference image registration process and the inspection setting process are completed. When the button 506 is pressed, the job management screen 500 transitions to an inspection job setting screen 900 illustrated in FIG. 9.

Next, the reference image registration process will be described with reference to FIGS. 6, 7A, and 7B.

FIG. 6 illustrates an example of the reference image registration job setting screen 600 displayed on the UI unit 320 of the inspection apparatus 110 in order to set a reference image registration job. The sheet size and the number of sheets are set on this screen in a case where the reference image registration is newly performed. A button 601 is used to turn off the display of the reference image registration job setting screen 600. When the button 601 is pressed, the reference image registration job setting screen 600 transitions to the job management screen 500 illustrated in FIG. 5. The reference image registration job setting screen 600 in FIG. 6 may be displayed in a superimposed manner on the job management screen 500 in FIG. 5.

A setting portion 602 is used to set the sheet size of the print job (the inspection job) for which the reference image registration is to be performed.

A setting portion 603 is used to set the number of sheets (per copy) of the inspection job. If the number of sheets (per copy) is set to two or more, a plurality of images can be registered as reference images.

Figure 7A:
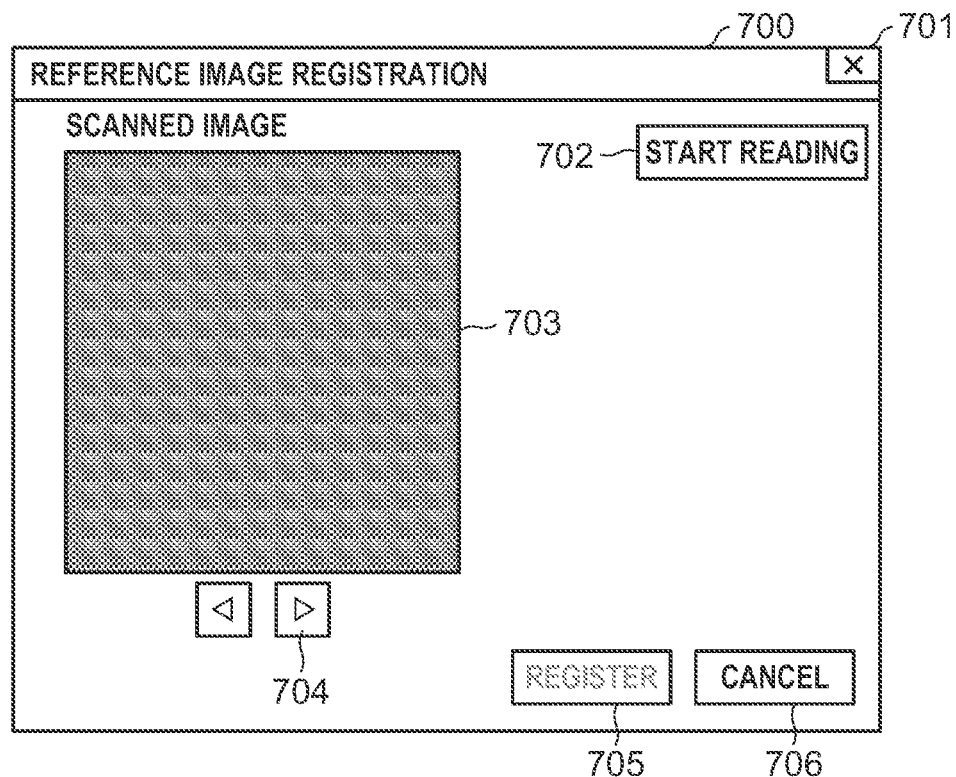
FIGS. 7A and 7B are diagrams illustrating examples of a UI screen for reference image registration according to the first exemplary embodiment.

A button 604 is an "OK" button used to save the settings made on the reference image registration job setting screen 600 and enables a transition to a reference image registration screen 700 illustrated in FIG. 7A.

A button 605 is a "cancel" button used to transition to the job management screen 500 illustrated in FIG. 5 without saving the settings made on the reference image registration job setting screen 600.

FIG. 7A illustrates an example of the reference image registration screen 700 displayed on the UI unit 320 of the inspection apparatus 110 in order to perform the reference image registration.

A button 701 is used to turn off the display of the reference image registration screen 700. When the button 701 is pressed, the reference image registration screen 700 transitions to the reference image registration job setting screen 600 illustrated in FIG. 6. The reference image registration screen 700 in FIG. 7A may be displayed in a superimposed manner on the reference image registration job setting screen 600 in FIG. 6.

A button 702 is used to start reading a sheet for the reference image registration. When the button 702 is pressed, the inspection apparatus 110 enters a reading standby state. When a sheet is conveyed from the image forming apparatus 100, the inspection apparatus 110 reads the sheet to acquire a scanned image.

An area 703 displays the image of the read sheet. The area 703 displays nothing before start of the reading. When the scanned image is acquired, the acquired image is displayed in the area 703. If a plurality of sheets is read, the displayed image can be switched using buttons 704. If the front and back sides of a sheet is read, the displayed image can be switched using the buttons 704.

A button 705 is used to register the scanned image as the reference image. If the reading is completed, the button 705 is enabled.

A button 706 is a "cancel" button used to transition to the reference image registration job setting screen 600 illustrated in FIG. 6 without registering the scanned image as the reference image.

Figure 7B:
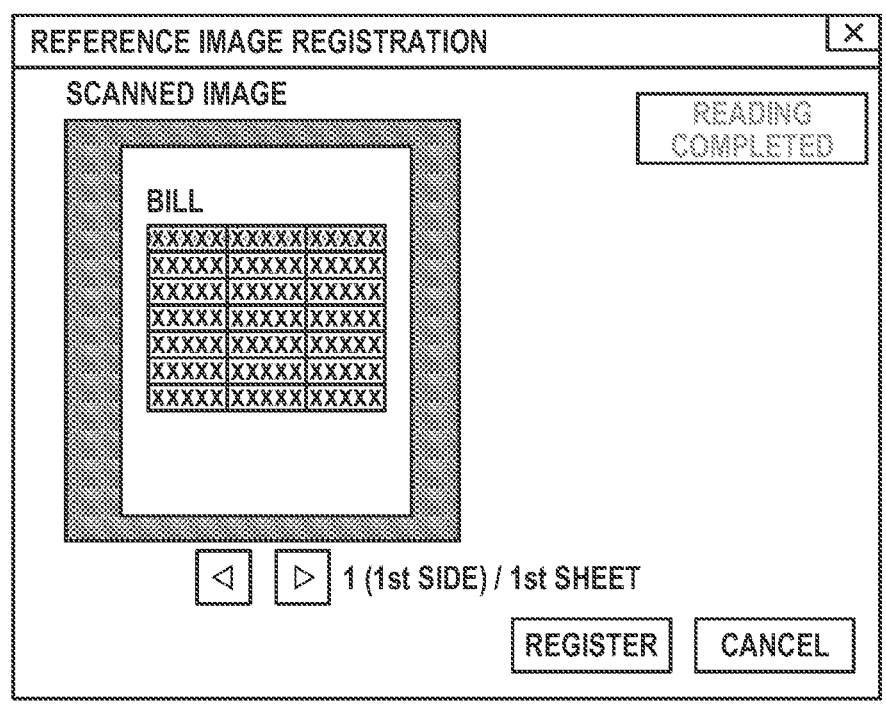

FIG. 7B illustrates an example of the reference image registration screen 700 displayed after the reading is completed.

The area 703 displays the scanned image, and the button 705 is enabled. When the button 705 is pressed, the reference image registration screen 700 transitions to the inspection setting screen 800 illustrated in FIG. 8.

Next, the inspection setting process will be described with reference to FIG. 8.

Figure 8:
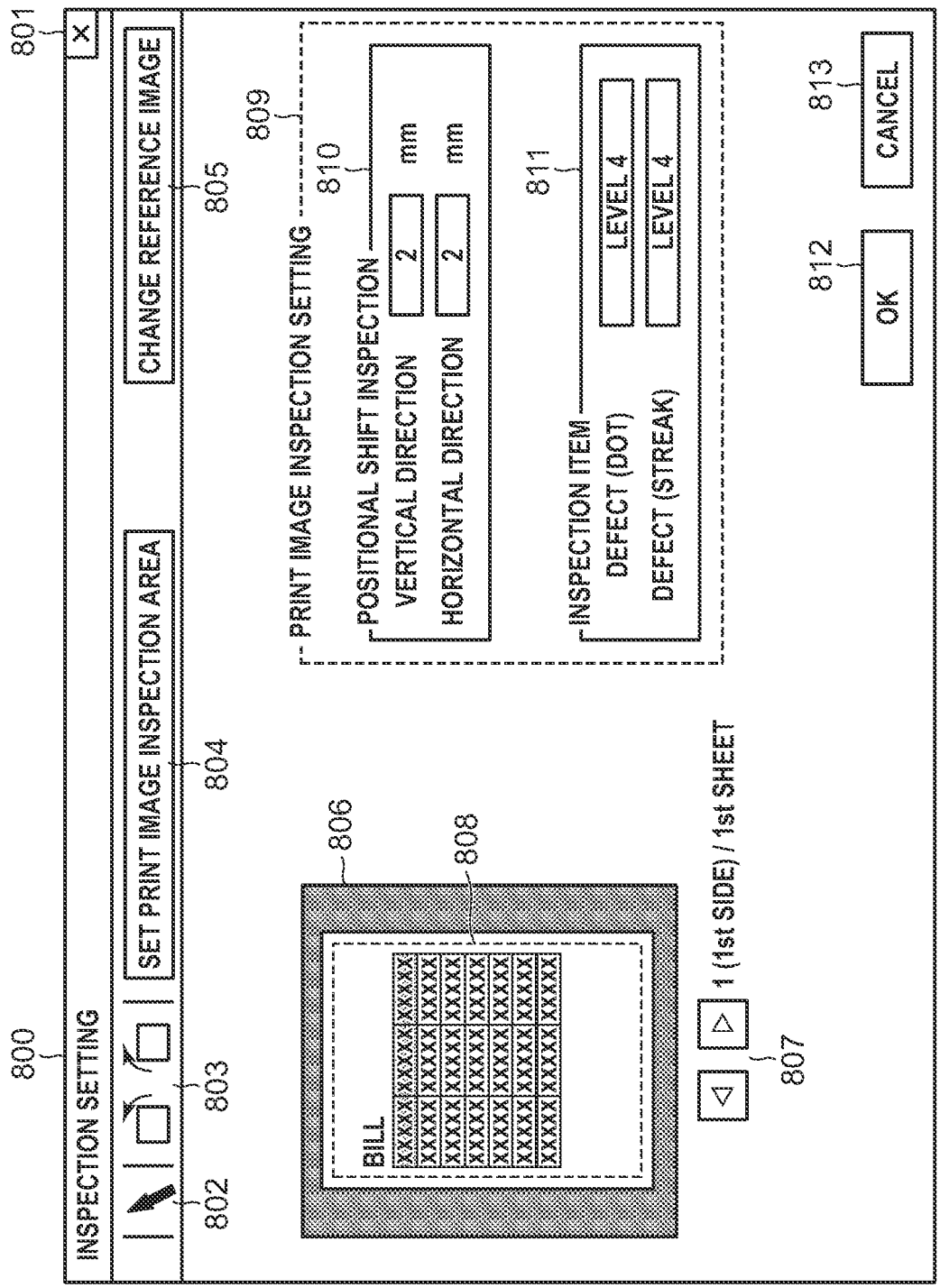
FIG. 8 is a diagram illustrating an example of a UI screen for inspection setting according to the first exemplary embodiment.

FIG. 8 illustrates an example of the inspection setting screen 800 displayed on the UI unit 320 of the inspection apparatus 110 in order to make inspection settings.

A button 801 is used to turn off the display of the inspection setting screen 800. When the button 801 is pressed, the inspection setting screen 800 transitions to the job management screen 500 illustrated in FIG. 5.

A button 802 is used to select an inspection area and is pressed by the user when the user desires to select an already set area.

Buttons 803 are used to rotate a reference image displayed in an area 806.

A button 804 is pressed by the user when the user newly generates an inspection area (a print image inspection area). After pressing the button 804, the user sets an inspection area in the reference image displayed in the area 806.

A button 805 is used to change the reference image. When the button 805 is pressed, the inspection setting screen 800 transitions to the reference image registration screen 700 illustrated in FIG. 7A.

The area 806 is a display area that displays the reference image acquired by reading a sheet. If a plurality of sheets is read, the displayed image can be switched using buttons 807. If the front and back sides of a sheet are read, the displayed image can be switched using the buttons 807.

An area 808 is an example of the print image inspection area set by a user's operation. The print image inspection area is the inspection area where a defect in a print image portion of the print product is to be detected.

A setting area 809 includes a group of UIs for setting the level of a defect to be detected when the print image inspection is performed. An inspection item 811 of the print image inspection indicates the feature of a defect to be detected when the print product is inspected.

A setting item 810 corresponds to the setting of positional shift inspection and is used to set the amounts of shift in the print position relative to the reference image. In the present exemplary embodiment, an example where the setting item 810 is specified by the user in a case where a positional shift with a shift amount of 2 mm or more is to be detected is illustrated. Examples of the inspection item 811 of the print image inspection include a circular defect (a dot) and a linear defect (a streak). The inspection level of the inspection item 811 is a parameter, including levels, set for each defect feature, and indicates a minimum size with which the detected defect feature is determined as a defect. For example, the inspection level includes five levels from level 1 to level 5. A thinner and smaller defect is detectable at level 5 than at level 1. The inspection level can be set for each inspection item 811. For example, the inspection level can be set to 5 for the dot defect and set to 4 for the streak defect. The inspection setting screen 800 indicates that level 4 is selected as the inspection level of the dot defect and level 4 is selected as the inspection level of the streak defect by the user.

Figure 9:
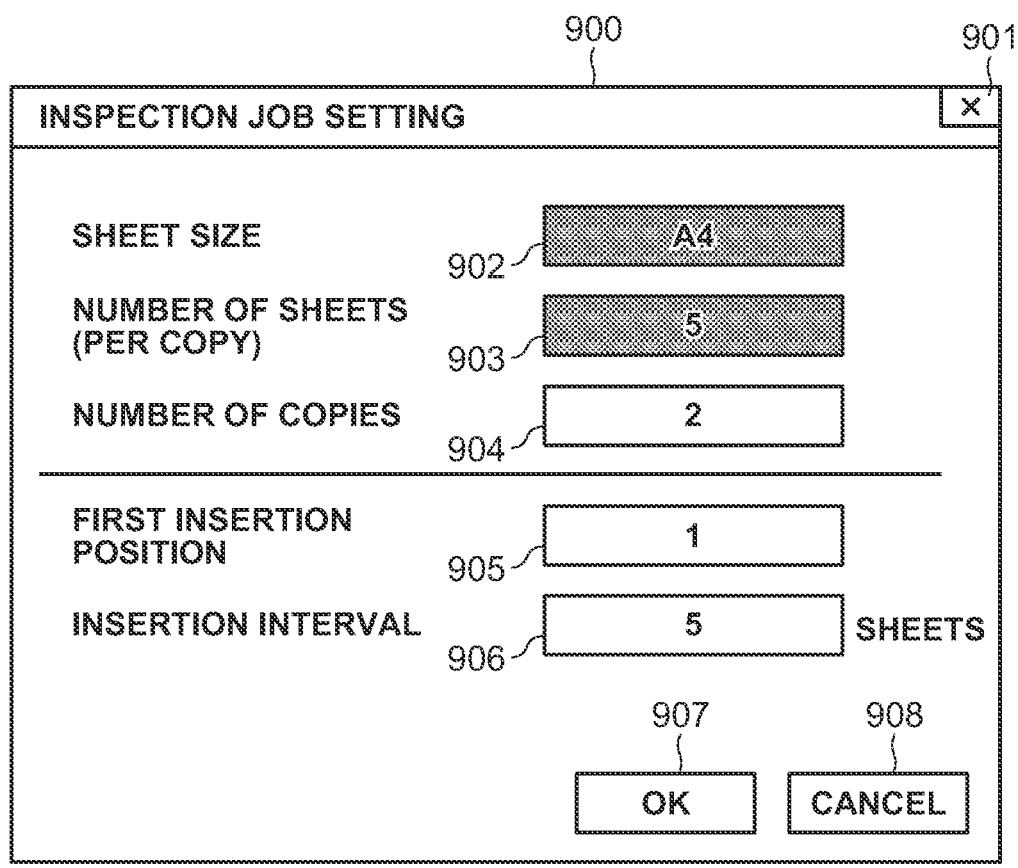
FIG. 9 is a diagram illustrating an example of a UI screen for inspection job setting according to the first exemplary embodiment.

A button 812 is an "OK" button used to save the settings made on the inspection setting screen 800 and enables a transition to the inspection job setting screen 900 illustrated in FIG. 9.

A button 813 is a "cancel" button used to transition to the job management screen 500 illustrated in FIG. 5 in a state where the reference image is saved and the settings made on the inspection setting screen 800 are not saved.

Next, the inspection process will be described with reference to FIGS. 9, 10A, and 10B.

FIG. 9 illustrates an example of the inspection job setting screen 900 displayed on the UI unit 320 of the inspection apparatus 110 in order to set an inspection job.

A button 901 is used to turn off the display of the inspection job setting screen 900. When the button 901 is pressed, the inspection job setting screen 900 transitions to the job management screen 500 illustrated in FIG. 5.

A setting portion 902 indicates the sheet size of the inspection job (the print job to be inspected). Since the sheet size is set when the reference image registration is performed, the sheet size is simply displayed and the setting value thereof is not changeable on this screen.

A setting portion 903 indicates the number of sheets (per copy) of the inspection job. Since the number of sheets (per copy) is set when the reference image registration is performed, the number of sheets (per copy) is simply displayed and the setting value thereof is not changeable on this screen.

A setting portion 904 is used to set the number of copies of the inspection job.

A setting portion 905 is used to set an ordinal position where a first insertion sheet is to be inserted. If an insertion sheet is to be inserted at the beginning of the inspection job, "1" is set in the setting portion 905. If no insertion sheet is to be inserted in the inspection job, "0" is set in the setting portion 905.

A setting portion 906 is used to set an insertion interval indicating every how many sheets an insertion sheet is to be inserted after the first insertion sheet is inserted. If an insertion sheet is to be inserted every five inspection sheets, "5" is set in the setting portion 906. If "0" is set in the setting portion 905, the setting portion 906 is disabled.

For example, if an insertion sheet is to be inserted only at the beginning of the print job, "1" is set in the setting portion 905, and "0" is set in the setting portion 906.

The details of the setting portions 905 and 906 will be described below.

Figure 10A:
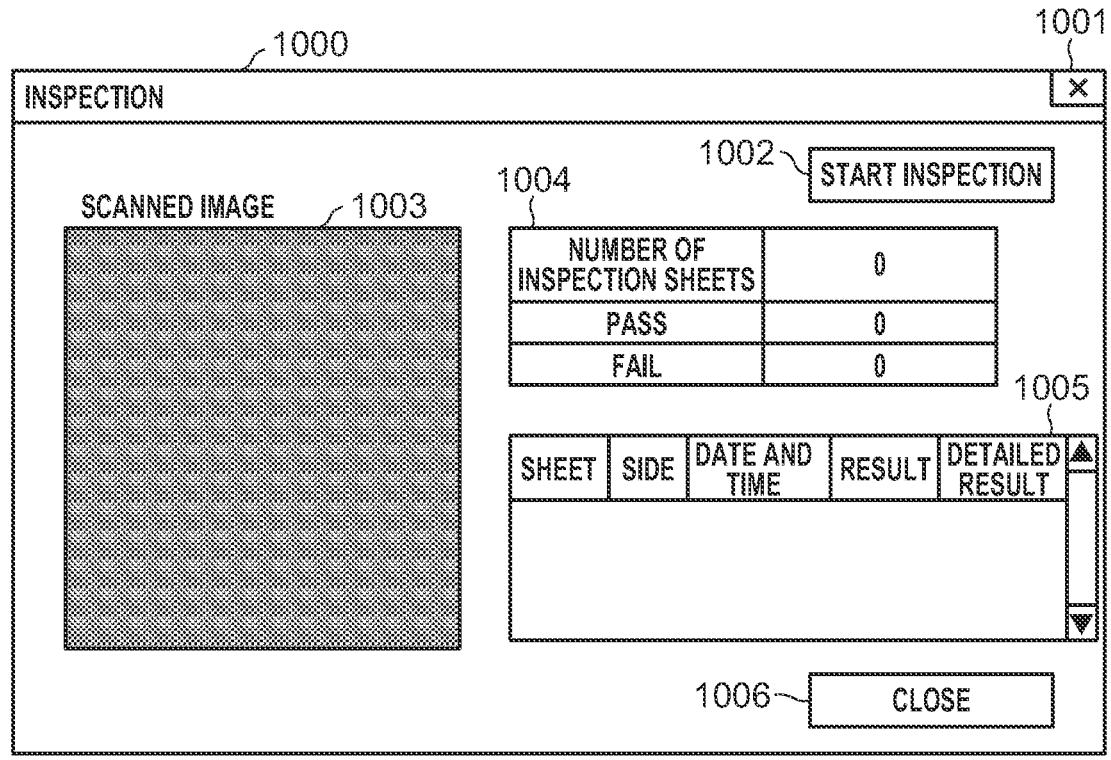
FIGS. 10A and 10B are diagrams illustrating examples of a UI screen for inspection according to the first exemplary embodiment.

A button 907 is an "OK" button used to save the settings made on the inspection job setting screen 900 and enables a transition to an inspection screen 1000 illustrated in FIG. 10A.

A button 908 is a "cancel" button used to transition to the job management screen 500 illustrated in FIG. 5 without saving the settings made on the inspection job setting screen 900.

The user can enter a setting value in each of the setting portions 904 to 906. For example, the settings are made using a keyboard (not illustrated) or a software key (not illustrated) displayed on the inspection job setting screen 900.

FIG. 10A illustrates an example of the inspection screen 1000 displayed on the UI unit 320 of the inspection apparatus 110 at the time of inspection.

A button 1001 is used to turn off the display of the inspection screen 1000. When the button 1001 is pressed, the inspection screen 1000 transitions to the job management screen 500 illustrated in FIG. 5.

A button 1002 is used to start reading a sheet.

An area 1003 displays an image of the read sheet. The area 1003 displays nothing before the inspection is started.

An area 1004 displays the inspection result. An area 1005 displays the inspection result for each side of the inspection sheet. If the inspection result is "fail", the detailed result indicating the cause of the fail is also displayed. In the present exemplary embodiment, the total number of inspection sheets, the number of inspection sheets determined as "pass", and the number of inspection sheets determined as "fail" are displayed. The display items, however, are not limited thereto, and can be any items that facilitate the user's understanding of the inspection result.

A button 1006 is used to save the inspection result and end the inspection. When the button 1006 is pressed, the inspection screen 1000 transitions to the job management screen 500 illustrated in FIG. 5.

Figure 10B:
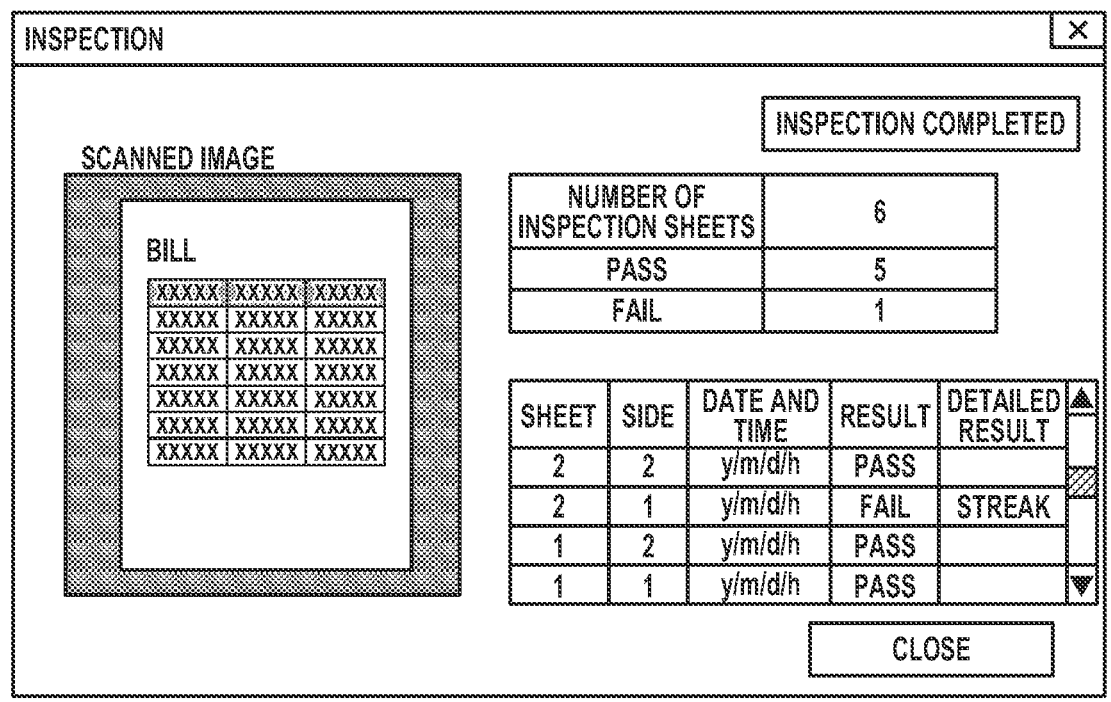
Figure 11:
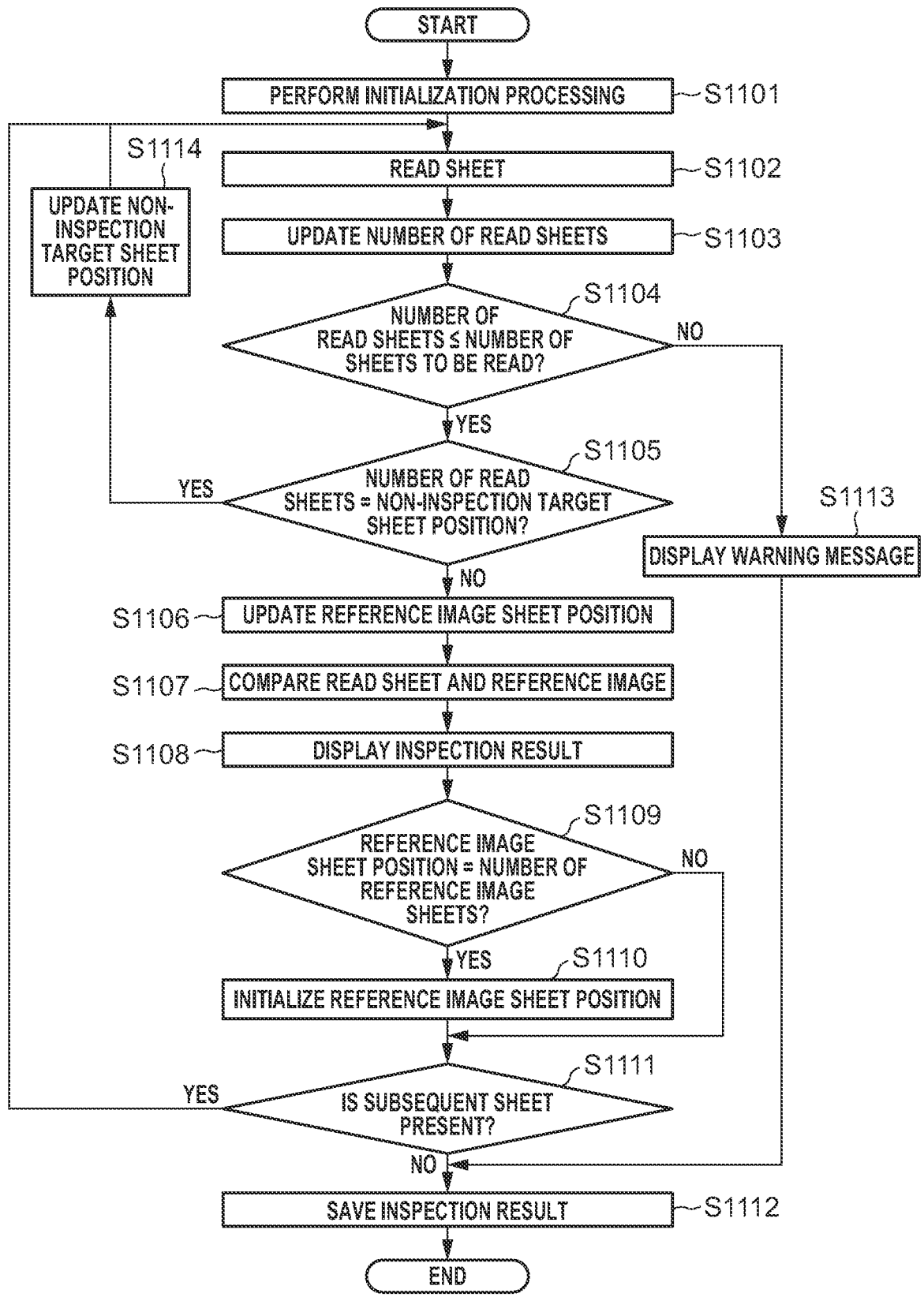
FIG. 11 is a flowchart illustrating an example of inspection execution in step S404 according to the first exemplary embodiment.

FIG. 10B illustrates an example of the inspection screen 1000 displayed after the reading is completed.

The area 1003 displays the image of a read sheet, and the area 1004 displays the inspection result. The inspection result can be displayed while being superimposed on the image displayed on the area 1003.

<Product Inspection Procedure>

Figure 4:
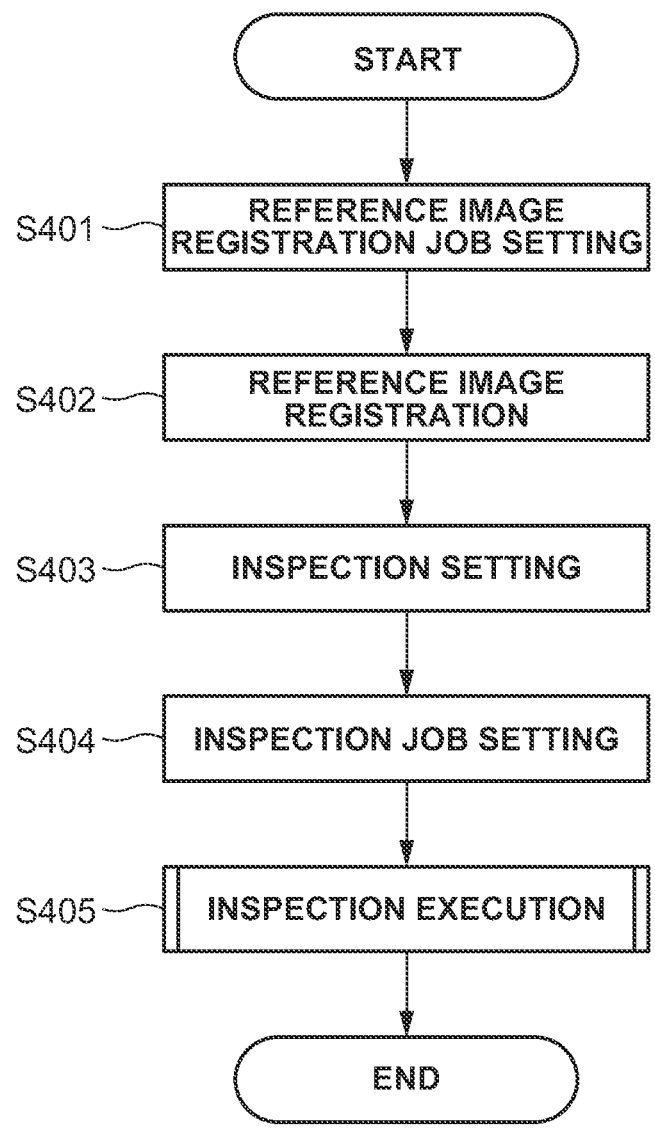
FIG. 4 is a flowchart illustrating an example of overall inspection processing according to the first exemplary embodiment.

Next, an overall inspection procedure from the registration before inspection to the execution of the inspection, which is performed by the inspection apparatus 110, will be described with reference to a flowchart in FIG. 4.

This flowchart is implemented by the CPU 302 loading a program code stored in the ROM 304 into the RAM 303 and reading and executing the program code loaded into the RAM 303.

In step S401, the CPU 302 saves the job settings for the reference image registration. More specifically, the CPU 302 saves the information set on the reference image registration job setting screen 600 illustrated in FIG. 6, in the RAM 303 of the inspection apparatus 110.

In step S402, the CPU 302 registers a reference image. When the button 702 is pressed on the reference image registration screen 700 illustrated in FIG. 7A, the CPU 302 brings the inspection apparatus 110 into the reading standby state. When a print sheet is conveyed to the inspection apparatus 110, the CPU 302 reads the print sheet to generate a scanned image. The CPU 302 displays the scanned image in the area 703 illustrated in FIG. 7A. When the button 705 is pressed, the CPU 302 saves the scanned image as the reference image in the RAM 303 of the inspection apparatus 110.

In step S403, the CPU 302 saves various inspection setting values such as the inspection area and the inspection level in the RAM 303 of the inspection apparatus 110 based on the inspection setting information set by the user on the inspection setting screen 800 illustrated in FIG. 8.

In step S404, the CPU 302 saves the setting values set on the inspection job setting screen 900 illustrated in FIG. 9, in the RAM 303 of the inspection apparatus 110.

In step S405, the CPU 302 executes the inspection. When the button 1002 (the "start inspection" button) is pressed on the inspection screen 1000 illustrated in FIG. 10A, the CPU 302 brings the inspection apparatus 110 into the reading standby state. When a sheet is conveyed to the inspection apparatus 110, the CPU 302 reads the sheet to generate a scanned image and saves the scanned image in the RAM 303 of the inspection apparatus 110. For example, if one side of an inspection sheet is to be inspected, one side of the inspection sheet is read to generate one scanned image. If both sides of an inspection sheet are to be inspected in two-sided printing, both sides of the inspection sheet are read to generate two scanned images. Then, the CPU 302 performs inspection by comparing the scanned image with the reference image registered in step S402, using the setting values set in steps S403 and S404. The details of step S405 according to the present exemplary embodiment will be described next.

<Inspection Execution Procedure>

The details of the inspection execution procedure in step S405 will be described with reference to a flowchart in FIG.

11. This flowchart is implemented by the CPU 302 loading a program code stored in the ROM 304 into the RAM 303 and reading and executing the program code loaded into the RAM 303.

In step S1101, the CPU 302 performs initialization processing on a counter to be used in the inspection processing. The counter to be used is executed by the CPU 302 in order to count the number of scanned images generated by the image reading unit 310, i.e., the number of read sheets. In the initialization processing on the counter, the CPU 302 initializes the number of read sheets, a reference image sheet position, and a non-inspection target sheet position. The number of read sheets is the number of sheets read by the inspection apparatus 110 and is updated every time a sheet is read. The read sheets correspond to the scanned images generated by the image reading unit 310. The number of read sheets refers to the number of sheets read by the image reading unit 310, and both a print product printed by the printer unit 210 and an insertion sheet inserted into the print product are targets for calculating the number of read sheets. The reference image sheet position indicates the ordinal position of the reference image to be compared with a scanned image, among the images registered in advance as reference images. For example, in a state where reference images are registered for five inspection sheets, and in a case where the reference image for the second inspection sheet is to be compared with a scanned image, "2" is specified as the reference image sheet position. The non-inspection target sheet position indicates the ordinal position of the sheet to be treated as a non-inspection target next, among the sheets to be read by the inspection apparatus 110. If "1" is set as the non-inspection target sheet position, the first sheet of the inspection job is processed as a non-inspection target.

The number of read sheets and the reference image sheet position are set to "0". As the non-inspection target sheet position, the first insertion position saved in the setting portion 905 illustrated in FIG. 9 is set. In the present exemplary embodiment, "1" is set as the non-inspection target sheet position.

In step S1102, the CPU 302 reads a sheet. When the button 1002 (the "start inspection" button) is pressed on the inspection screen 1000 illustrated in FIG. 10A, the CPU 302 brings the inspection apparatus 110 into the reading standby state. When a sheet is conveyed to the inspection apparatus 110, the CPU 302 reads the sheet to generate a scanned image, and saves the scanned image in the RAM 303 of the inspection apparatus 110.

In step S1103, the CPU 302 updates the number of read sheets. Since sheets are read one by one, the number of read sheets is incremented every time the reading of one sheet is completed. In other words, the number of read sheets is increased by one every time the reading of one sheet is completed.

In step S1104, the CPU 302 determines whether the number of read sheets exceeds the number of sheets to be read. In the present exemplary embodiment, it is assumed that the CPU 302 calculates the number of sheets to be read in advance. Examples of the method for calculating the number of sheets to be read include the calculation based on the inspection job setting values illustrated in FIG. 9. A specific example thereof will be described with reference to FIG. 9. The number of inspection sheets (sheets to be inspected) is "5" (sheets)×"2" (copies), i.e., 10, the setting value in the setting portion 905 indicating the first insertion position is "1", and the setting value in the setting portion 906 indicating the insertion interval is "5". Thus, the number of insertion sheets to be inserted before the inspection of the inspection sheets is completed is "2", and the number of sheets to be read is "12". If the CPU 302 determines that the number of read sheets is less than or equal to the number of sheets to be read (YES in step S1104), the processing proceeds to step S1105. If the number of read sheets exceeds the number of sheets to be read (NO in step S1104), the processing proceeds to step S1113. In step S1113, the CPU 302 displays on the UI unit 320 a warning message indicating that the number of sheets to be read is exceeded.

In step S1105, the CPU 302 determines whether the sheet read in step S1102 is a non-inspection target sheet. More specifically, the CPU 302 determines whether the number of read sheets updated in step S1103 by reading the sheet in step S1102 matches the number of sheets set as the non-inspection target sheet position. If the number of read sheets matches the non-inspection target sheet position (YES in step S1105), the processing proceeds to step S1114. In step S1114, the CPU 302 updates the non-inspection target sheet position. In the present exemplary embodiment, if the current non-inspection target sheet position is "1" and the setting value set in the setting portion 906 illustrated in FIG. 9 is "5", the CPU 302 updates the non-inspection target sheet position based on the following formula.

Non-inspection target sheet position=Current non-inspection target sheet position+Insertion interval+1

In this case, 1+5+1=7, and thus, the next non-inspection target sheet position is "7" (the seventh sheet).

If the number of read sheets does not match the non-inspection target sheet position (NO in step S1105), the processing proceeds to step S1106.

Figure 12A:
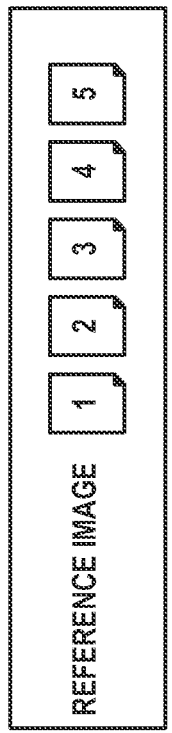
FIGS. 12A, 12B, and 12C are schematic diagrams illustrating an inspection method according to the first exemplary embodiment.

FIG. 12A illustrates the images registered as the reference images in the present exemplary embodiment. In the present exemplary embodiment, an example where the number of sheets per copy is set to "5" on the reference image registration job setting screen 600 illustrated in FIG. 6 is illustrated.

Figure 12B:
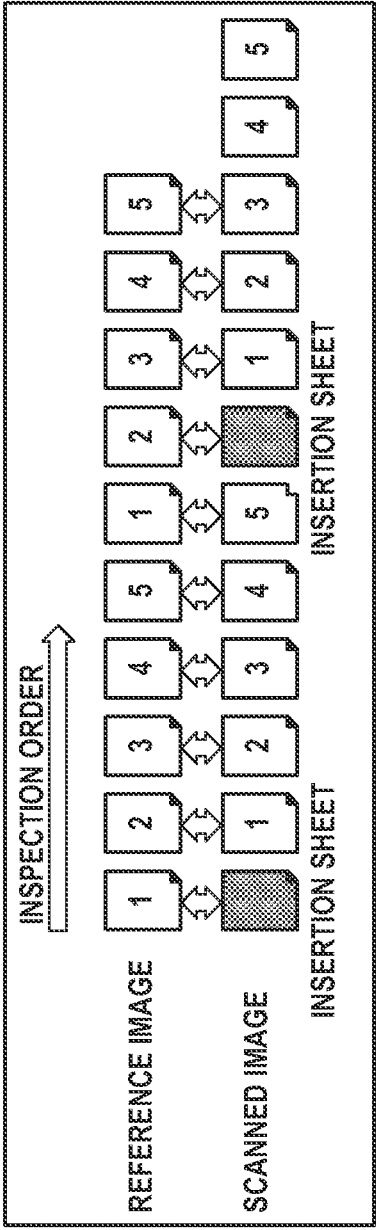

FIG. 12B illustrates an example of a case where the number of copies is set to "2" on the inspection job setting screen 900 illustrated in FIG. 9, and an inspection job in which an insertion sheet is inserted at the beginning of each copy is printed. In other words, the insertion positions of insertion sheets correspond to the first and seventh scanned images. If the setting portion 905 is set to "0" (which indicates no insertion sheet) on the inspection job setting screen 900 illustrated in FIG. 9, the CPU 302 determines that no insertion sheet is to be inserted, and sequentially assigns the reference images to the sheets of the inspection job in order from the first sheet for the purpose of comparison. However, in the example of FIG. 12B, in the scanned images, the scanned image of an insertion sheet is inserted at the beginning of each copy, and thus the reference image for the first inspection sheet and the scanned image of the insertion sheet are compared with each other and this causes the inspection result to be "fail". This also disrupts the ordinal relationships between the subsequent inspection sheets and the reference images. Thus, the inspection results on all the read images are fail.

Figure 12C:
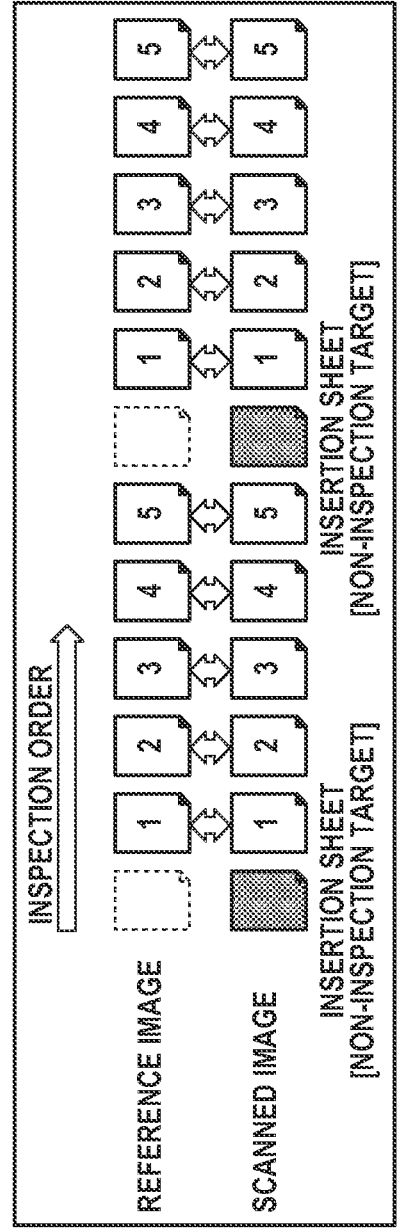

FIG. 12C illustrates a case where "1" is set in the setting portion 905 and "5" is set in the setting portion 906 on the inspection job setting screen 900 illustrated in FIG. 9. Since "1" is set in the setting portion 905, the CPU 302 determines that the first sheet is an insertion sheet, and does not perform the comparison inspection on the first sheet. The CPU 302 also updates the non-inspection target sheet position and determines whether the number of read sheets matches the non-inspection target sheet position, thereby making it possible to exclude the insertion sheets from the inspection targets.

In step S1106, the CPU 302 updates the reference image sheet position. Since the reference image is changed for each inspection sheet, the reference image sheet position is incremented by one in this step.

In step S1107, the CPU 302 compares the read sheet and the reference image corresponding to the reference image sheet position updated in step S1106.

In step S1108, the CPU 302 displays the inspection screen 1000 on the UI unit 320. The inspection screen 1000 is updated every time the comparison inspection on one sheet is completed. The method for displaying the inspection result on the UI unit 320 is not limited to the inspection screen 1000 illustrated in FIG. 10B, and may be any method capable of displaying a detection result to the user in an easily understandable manner.

The CPU 302 also transmits the inspection result obtained in step S1107 to the image forming apparatus 100 and the finisher 120. The information transmitted to the image forming apparatus 100 indicates that a certain number of successive print products are defective, and the information transmitted to the finisher 120 indicates whether each print product has a defect. As described above, when the image forming apparatus 100 receives the above information, the image forming apparatus 100 stops the printing operation. As described above, based on the received information, the finisher 120 discharges a print product without a defect to the normal sheet discharge tray and discharges a print product with a defect to a tray different from the normal sheet discharge tray.

In step S1109, the CPU 302 determines whether the sheet read in step S1102 is a sheet corresponding to the last of the reference images. In other words, the CPU 302 determines whether the printing of one copy is completed. More specifically, the CPU 302 determines whether the reference image sheet position is the number of reference image sheets. The number of reference image sheets is the number of sheets set for the reference image registration, i.e., the number of sheets per copy. If the reference image sheet position is the number of reference image sheets (YES in step S1109), the processing proceeds to step S1110. If the reference image sheet position is not the number of reference image sheets (NO in step S1109), the processing proceeds to step S1111.

In step S1110, the CPU 302 initializes the reference image sheet position. In this step, the CPU 302 sets the reference image sheet position to "0". Since an inspection sheet and the corresponding reference image are compared with each other during the inspection, if a plurality of copies is set for the inspection job, the reference image is repeatedly applied to each copy. Thus, the initialization processing is performed.

In step S1111, the CPU 302 determines whether there is a subsequent sheet to be conveyed. If a subsequent sheet is present (YES in step S1111), the processing returns to step S1102.

If a subsequent sheet is not present (NO in step S1111), the processing proceeds to step S1112.

In step S1112, the CPU 302 saves the inspection result and ends the inspection.

In step S1113, the CPU 302 displays on the UI unit 320 a warning message indicating that the number of sheets to be read is exceeded.

Figure 15:
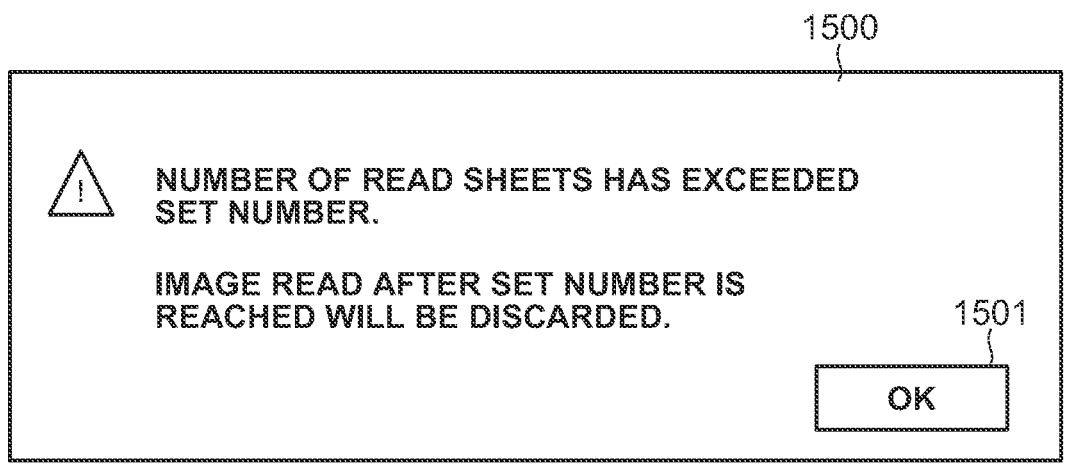
FIG. 15 is a diagram illustrating an example of a warning message screen according to the first exemplary embodiment.

FIG. 15 illustrates a warning screen 1500 according to the present exemplary embodiment.

A button 1501 is used to turn off the display of the warning screen 1500. When the button 1501 is pressed, the warning screen 1500 transitions to the inspection screen 1000 illustrated in FIG. 10A. The warning screen 1500 in FIG. 15 may be displayed in a superimposed manner on the inspection screen 1000 in FIG. 10A.

The above is the description of the inspection execution procedure in step S405.

As described above, according to the present exemplary embodiment, it is possible to provide an inspection system that does not perform inspection processing on an insertion sheet even if a code is not printed on the insertion sheet, thereby eliminating the need to perform printing processing on the insertion sheet in advance. In other words, it is possible to provide an inspection system that does not perform inspection processing on an insertion sheet even if processing for excluding the insertion sheet from the inspection targets is not performed, thereby enabling product inspection on the print product into which the insertion sheet is inserted.

In the first exemplary embodiment, the method of setting the insertion position of an insertion sheet to be inserted first into a print product and the insertion interval for insertion sheets, thereby excluding the insertion sheets from the inspection targets. In the setting method according to the first exemplary embodiment, however, whether to insert an insertion sheet after the last inspection sheet illustrated in FIG. 12C depends on the inspection job. If it is assumed that the insertion sheet is inserted after the last inspection sheet, the inspection apparatus 110 waits until the insertion sheet is conveyed to the inspection apparatus 110, and thus the inspection may be unable to be completed. If, on the other hand, it is assumed that the insertion sheet is not inserted after the last inspection sheet, then in an inspection job in which an insertion sheet is to be inserted after the last inspection sheet, a warning message indicating that the number of sheets to be read is exceeded is displayed at the timing when the insertion sheet is read after the last inspection sheet.

In a second exemplary embodiment, a description will be given of a method for, even if an insertion sheet is inserted after the last inspection sheet of an inspection job, excluding the insertion sheet from the inspection targets without displaying a warning message.

Differences between the present exemplary embodiment and the first exemplary embodiment will be described. Portions similar to those in the first exemplary embodiment will not be described in detail.

Figure 13:
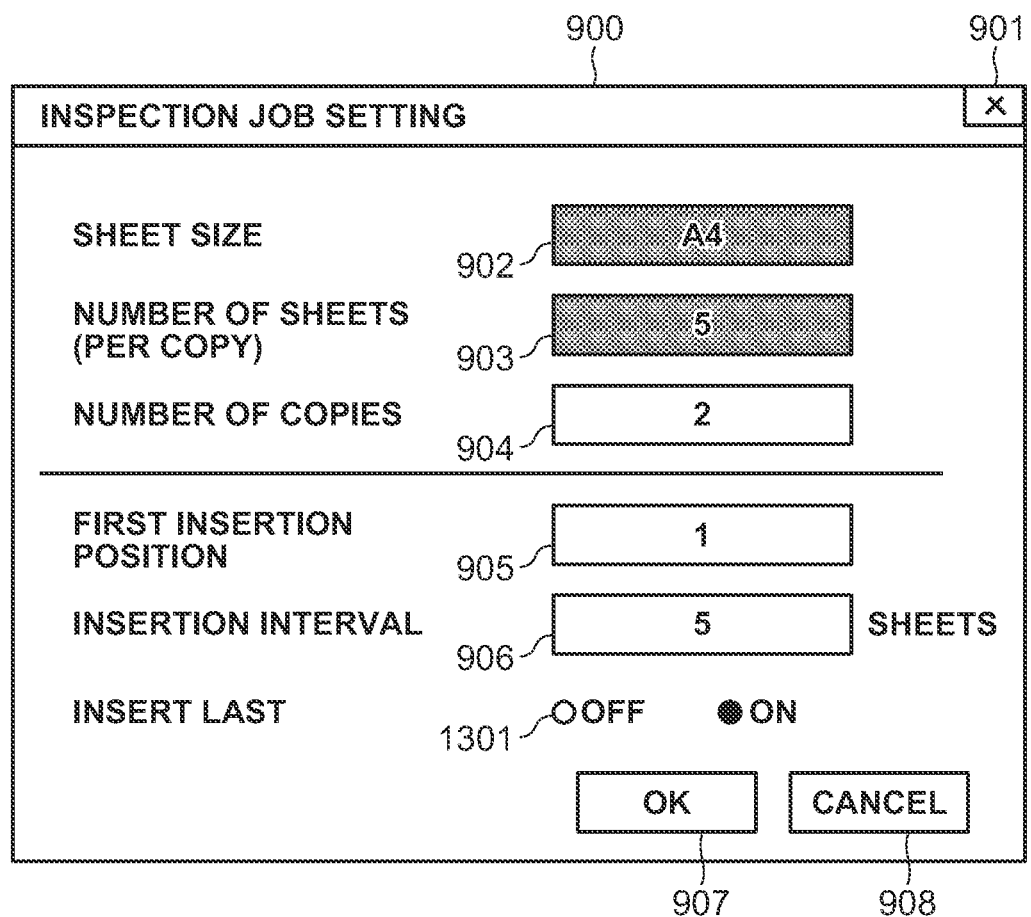
FIG. 13 is a diagram illustrating an example of a UI screen for inspection job setting according to a second exemplary embodiment.

FIG. 13 illustrates an example of the inspection job setting screen 900 displayed on the inspection apparatus 110 in order to set an inspection job according to the present exemplary embodiment. The portions 901 to 908 are similar to those in the first exemplary embodiment, and thus will not be described.

A setting portion 1301 is used to set whether to insert an insertion sheet after the last inspection sheet of the inspection job. If the setting portion 1301 is set to "OFF", an insertion sheet is not to be inserted after the last inspection sheet of the inspection job. If the setting portion 1301 is set to "ON", an insertion sheet is to be inserted after the last inspection sheet of the inspection job. Based on this setting, the CPU 302 determines whether to update the number of sheets to be read.

Figure 14:
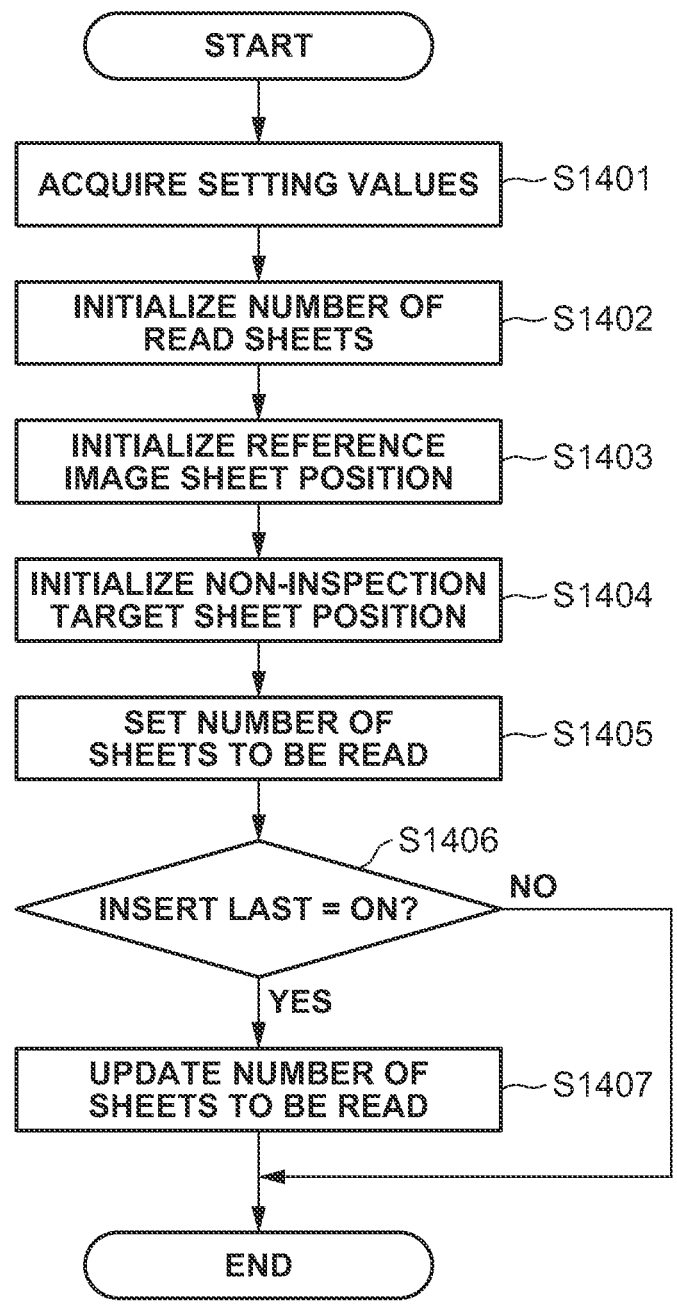
FIG. 14 is a flowchart illustrating an example of initialization processing in step S1101 according to the second exemplary embodiment.

Initialization processing in step S1101 according to the present exemplary embodiment will be described in detail with reference to a flowchart in FIG. 14. This flowchart is implemented by the CPU 302 loading a program code stored in the ROM 304 into the RAM 303 and executing the program code.

In step S1401, the CPU 302 acquires the setting values set in the inspection job setting screen 900 in FIG. 13 and stored in the RAM 303.

In step S1402, the CPU 302 initializes the number of read sheets. In this step, the CPU 302 sets the number of read sheets to "0".

In step S1403, the CPU 302 initializes the reference image sheet position. In this step, the CPU 302 sets the reference image sheet position to "0".

In step S1404, the CPU 302 initializes the non-inspection target sheet position. The CPU 302 sets the non-inspection target sheet position based on the setting value of the setting portion 905 illustrated in FIG. 13. In this step, the CPU 302 sets the non-inspection target sheet position to "1".

In step S1405, the CPU 302 sets the number of sheets to be read. Based on the setting values illustrated in FIG. 13, the number of inspection sheets is "5" (sheets)×"2" (copies), i.e., 10, the setting value in the setting portion 905 indicating the first insertion position is "1", and the setting value in the setting portion 906 indicating the insertion interval is "5". Thus, the number of insertion sheets to be inserted before the inspection of the inspection sheets is completed is "2", and the number of sheets to be read is "12".

In step S1406, the CPU 302 determines whether the setting portion 1301 illustrated in FIG. 13, which is the setting for inserting an insertion sheet after the last inspection sheet, is set to "ON". If the setting portion 1301 is set to "ON" (YES in step S1406), the processing proceeds to step S1407. If the setting portion 1301 is set to "OFF" (NO in step S1406), the CPU 302 does not update the number of sheets to be read, and the initialization processing ends.

In step S1407, the CPU 302 updates the number of sheets to be read. In this step, the CPU 302 adds one to the number of sheets to be read set in step S1405, thereby setting the number of sheets to be read to "13".

The number of sheets to be read is updated based on the setting of the setting portion 1301, thereby making it possible to exclude the insertion sheet from the inspection targets without displaying a warning message indicating that the number of sheets to be read is exceeded.

The above is the description of the initialization processing procedure in step S1101 according to the present exemplary embodiment.

As described above, according to the present exemplary embodiment, the number of sheets to be read is updated based on the setting of whether to insert an insertion sheet after the last inspection sheet of an inspection job, thereby making it possible to exclude the insertion sheet from the inspection targets without displaying a warning message indicating that the number of sheets to be read is exceeded.

While the exemplary embodiments of the present disclosure have been described above using various examples, the spirit and scope of the exemplary embodiments are not limited to a particular description in the specification.

According to the exemplary embodiments of the present disclosure, it is possible to provide a product inspection system that does not process a product inspection target into which an insertion sheet is inserted, as a print defect.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-200580, filed Dec. 10, 2021, which is hereby incorporated by reference herein in its entirety.

What is claimed is:

1. A printing system comprising:
a printer configured to print an image on a recording sheet;
an inserter configured to insert a sheet into a print product obtained by printing the image on the recording sheet;
an inspection apparatus configured to inspect the print product based on a scanned image generated by reading the print product and a reference image; and
one or more controllers having one or more processors and one or more memories, the one or more controllers being configured to:
generate scanned images by causing the printing system to read the print product and the inserted sheet;
register a reference image;
set an insertion position of the sheet to be inserted;
receive, by the inspection apparatus, information of the insertion position; and
perform control so that a scanned image corresponding to the set insertion position of the sheet is not to be inspected based on the information of the insertion position.

2. The printing system according to claim 1, wherein the one or more controllers are configured to set at least a first insertion position of the sheet to be inserted.

3. The printing system according to claim 1, wherein the one or more controllers are configured to set the insertion position of the sheet at least based on an insertion interval for the sheet to be inserted.

4. The printing system according to claim 1, wherein the one or more controllers are configured to perform control so that, among the generated scanned images, a scanned image that does not correspond to the set insertion position of the sheet is to be inspected.

5. The printing system according to claim 1, wherein the one or more controllers are further configured to:
   count a number of the generated scanned images; and
   perform control so that, among the generated scanned images, a scanned image corresponding to the counted number that matches the set insertion position of the sheet is not to be inspected.

6. The printing system according to claim 1, wherein the one or more controllers are configured to register an image corresponding to the print product as the reference image.

7. The printing system according to claim 1, wherein the one or more controllers are configured to not register an image corresponding to the inserted sheet as the reference image.

8. The printing system according to claim 1, further comprising:
   a printing apparatus configured to at least perform the printing; and
   the inspection apparatus configured to at least register the reference image and inspect the print product.

9. The printing system according to claim 1, wherein the one or more controllers are configured to set the insertion position of the sheet at least based on whether to insert the sheet at an end of the print product.

10. The printing system according to claim 1, further comprising a display control unit configured to display a screen on a display unit,
   wherein the display control unit displays a screen enabling input of at least a first insertion position of the sheet and an insertion interval for the sheet, on the display unit.

11. The printing system according to claim 10, wherein the display control unit displays a screen enabling input of whether to insert the sheet at an end of the print product, on the display unit.

12. The printing system according to claim 10, wherein in a case where a scanned image is generated after a preset number of images to be scanned is reached, the display control unit displays a warning message on the display unit.

13. The printing system according to claim 10,
   wherein the display control unit displays a first screen for displaying the scanned image generated by reading the print product, on the display unit, and
   wherein in a case where a scanned image is newly generated, the display control unit displays a second screen for displaying the newly generated scanned image, on the display unit.

14. The printing system according to claim 1, wherein the one or more controllers are configured to inspect the print product based on the scanned image generated by reading the print product and the registered reference image corresponding to the generated scanned image.

15. A method for controlling a printing system, the method comprising:
   inserting a sheet into a print product obtained by printing an image on a recording sheet;
   registering a reference image;
   inspecting the print product based on a scanned image generated by reading the print product and the reference image;
   setting an insertion position of the sheet to be inserted;
   receiving the information of the insertion position; and
   performing control so that a scanned image corresponding to the set insertion position of the sheet is not to be inspected based on the information of the insertion position.

16. A non-transitory computer-readable storage medium storing a program for causing a computer to execute the method according to claim 15.

* * * * *